Patented July 3, 1923.

1,460,646

UNITED STATES PATENT OFFICE.

RIDSDALE ELLIS, OF OAK PARK, ILLINOIS.

ICE MANUFACTURE.

No Drawing. Application filed January 20, 1919. Serial No. 272,212.

*To all whom it may concern:*

Be it known that I, RIDSDALE ELLIS, a citizen of the United States, and a resident of Oak Park, in the county of Cook and State of Illinois, have invented certain new and useful Improvements in Ice Manufacture, of which the following is a specification.

This invention relates to the manufacture of artificial ice and more particularly to raw-water ice as distinguished from distilled water ice.

In the freezing of water containing salts in solution crystals of ice entirely free from dissolved materials separate out leaving the salts in the unfrozen water. As the concentration of these salts in the neighbourhood of the ice crystals increases beyond the saturation point small crystals of salt are formed and these become embedded in the ice cake particularly in the lower part of the cake to form a white cloudy butt. For a cake to be readily saleable it must be substantially clear except for a feather down the center and a cloudy butt greatly detracts from its value.

Small amounts of readily soluble salts such as sodium carbonate are not in general deleterious but small quantities of calcium and magnesium salts, particularly the carbonates of these metals and the hydroxide of magnesium cause very considerable trouble as the crystals are exceedingly small and therefore affect the appearance of the cake out of proportion to their actual weight and also on account of their wide distribution throughout the butt owing to the fact that precipitation of these salts begins very shortly after the water has begun to freeze. Such an accumulation of calcium and magnesium salts in the butt of the ice cake is known in the art as a "lime pocket."

To reduce the size of the lime pockets it is usual to soften the water to reduce the content of calcium and magnesium salts to a minimum.

The usual softening treatment is based on the great difference in solubility between the normal carbonates and bicarbonates of calcium and the nearly insoluble character of magnesium hydroxide. The solubility of the latter is only about 0.9 parts per 100,000. The solubility of normal calcium carbonate is about 1.3 parts per 100,000 and that of magnesium carbonate is about 10.6 parts per 100,000. The solubility of these carbonates has been shown to increase proportionately to the amount of free carbon dioxide present so that in waters high in free carbon dioxide the calcium carbonate may run as high as 60 parts per 100,000 or higher. The same is true of magnesium carbonate.

By adding lime the free carbon dioxide may be neutralized and the bicarbonates converted into normal carbonates thereby precipitating calcium carbonate and some magnesium carbonate if the content of magnesium salts is high. To eliminate the unprecipitated magnesium salts additional lime is added. Carbonate of soda is added for precipitating sulphates, chlorides, etc., of calcium.

The precipitation of calcium and magnesium is never what it should be theoretically owing to the phenomenon of supersaturation so that the resulting softened water usually contains about 3½ to 4 parts of calcium carbonate and about 1½ to 2 parts of magnesium hydroxide per 100,000.

The clear portions of ice obtained from such softened water do not contain more than 0.5 parts per 100,000 of calcium and magnesium salts so that at least 90% of the latter salts are concentrated in the center and more particularly in the butt of the ice cake to form a lime pocket.

When the water contains excessive amounts of mineral salts it is usual "to pull the cores", in other words to remove by suction the unfrozen water after the cans have been, say, ¾ frozen and then replace the water withdrawn by fresh water. Such a method is not, however, ordinarily adapted for the elimination of the calcium and magnesium salts as these do not concentrate in solution but precipitate out and freeze into the butt during almost the whole freezing operation.

In most raw-water ice plants air is blown through the water during the freezing operation for the primary purpose of preventing the bubbles of air, carbon dioxide, etc., liberated from solution freezing into the ice and thereby making the cake cloudy and opaque or as it is known in the art a "tombstone". This air agitation to some extent also keeps the precipitated lime and magnesia salts from freezing into the ice so that they can be removed by core pulling.

By the use of certain substances such as citric acid and its salts in small amounts the need of air agitation to prevent the freezing in of air bubbles is avoided. It is particularly desirable when such substances are used to avoid the lime pockets as there is nothing to keep the precipitated lime from freezing into the ice even if core pulling is resorted to. Hence when such substances as citric acid or citrates are employed without agitation it is particularly desirable to employ means for eliminating the lime pockets.

The principal objects of my invention are the provision of an improved means of treating water for avoiding the formation of lime pockets, the provision of an improved method of treating water for ice manufacture, and generally to improve, simplify and cheapen the manufacture of artificial ice.

According to my invention I add to the water substances adapted to bring the calcium and magnesium compounds into a more soluble form. For this purpose I preferably employ compounds adapted to form double salts with the calcium and magnesium present such as salts of ammonium and more particularly ammonium chloride.

The amount of ammonium chloride is not under ordinary circumstances in excess of three times the amount of calcium and magnesium salts present. This quantity of ammonium chloride will increase the solubilities of these compounds much in excess of five times their previous value.

Usually I prefer to soften the water to remove as much of the calcium and magnesium as possible before adding the ammonium chloride. Where the water is naturally comparatively soft this softening treatment may in some cases be dispensed with although usually desirable for the purpose of eliminating the carbon dioxide both free and combined as bicarbonate.

In carrying out my invention in its preferred form I soften the water with lime and soda in well-known manner with the addition of a small amount of citric acid or its equivalent. The amount of citric acid required varies somewhat but for the water from Lake Michigan, for example, 6 ozs. of citric acid to 16,000 gallons of water is satisfactory. To the softened water is added about 20 lbs. of ammonium chloride and then the water is ready for freezing.

Usually the ice is frozen without core pulling but in some cases it may be desirable to pull the cores especially in the case of waters high in soluble mineral salts. Since the addition of ammonium chloride increases the solubility of the calcium and magnesium salts the latter remain in solution until the greater part of the water has frozen instead of precipitating during practically the whole freezing operation so that by pulling the cores substantially all of the calcium and magnesium salts can be removed.

Having thus described my invention and illustrated its use, what I claim as new and desire to secure by Letters Patent is :—

1. The process of making raw water ice which includes subjecting the water to softening treatment to eliminate calcium and magnesium salts then adding a substance adapted to increase materially the solubility of the calcium and magnesium compounds remaining in the water after the softening treatment and then freezing the water so treated.

2. The process of making raw water ice which includes adding a substance adapted to materially increase the solubility of the calcium and magnesium compounds and then freezing the water so treated.

3. The process of making raw water ice which includes adding a substance adapted to increase materially the solubility of the carbonate and hydroxide respectively of calcium and magnesium and then freezing the water so treated.

4. The process of making raw water ice which includes adding a salt adapted to increase materially the solubility of the calcium and magnesium compounds and then freezing the water so treated.

5. The process of making raw water ice which includes adding a salt adapted to increase materially the solubility of the carbonate and hydroxide respectively of calcium and magnesium and then freezing the water so treated.

6. The process of making raw water ice which includes adding a salt adapted to form a soluble double salt with the calcium and magnesium salts in the water and then freezing the water so treated.

7. The process of making raw water ice which includes adding an ammonium salt to increase the solubility of the calcium and magnesium compounds in the water and then freezing the water so treated.

8. The process of making raw water ice which includes adding ammonium chloride to increase the solubility of the calcium and magnesium compounds in the water and then freezing the water so treated.

9. The process of making raw water ice which includes subjecting the water to softening treatment to eliminate calcium and magnesium compounds then adding an ammonium salt to increase the solubility of the calcium and magnesium compounds remaining in the water after the softening treatment, and then freezing the water so treated.

10. The process of making raw water ice which includes adding a material adapted to inhibit the freezing of gas bubbles into the ice and a substance adapted to increase materially the solubility of the calcium and magnesium compounds and then freezing the water so treated.

11. The process of making raw water ice which includes adding sufficient of a substance adapted to increase the solubility of the calcium and magnesium compounds to increase the solubility more than five times its previous value and then freezing the water so treated.

12. The process of making raw water ice which includes adding an ammomium salt in sufficient amount to increase the solubility of the calcium and magnesium compounds more than five times and then freezing the water so treated.

RIDSDALE ELLIS.